United States Patent
Huo et al.

(10) Patent No.: US 8,648,952 B2
(45) Date of Patent: Feb. 11, 2014

(54) TIMING GENERATOR AND METHOD OF GENERATING TIMING SIGNALS

(75) Inventors: Bin Huo, Wayland, MA (US); Yimiao Zhao, Beijing (CN); Xianglun Leng, Beijing (CN); Ankit Khandelwal, Wilmington, MA (US); Yong Wang, Beijing (CN)

(73) Assignee: Analog Devices, Inc., Norwood, MA (US)

( * ) Notice: Subject to any disclaimer, the term of this patent is extended or adjusted under 35 U.S.C. 154(b) by 347 days.

(21) Appl. No.: 13/027,111

(22) Filed: Feb. 14, 2011

(65) Prior Publication Data

US 2012/0206633 A1 Aug. 16, 2012

(51) Int. Cl.
*H04N 3/14* (2006.01)

(52) U.S. Cl.
USPC .......................... 348/312; 348/294; 713/500

(58) Field of Classification Search
None
See application file for complete search history.

(56) References Cited

U.S. PATENT DOCUMENTS

| | | | |
|---|---|---|---|
| 5,278,673 A | 1/1994 | Scapa et al. | |
| 6,285,399 B1 | 9/2001 | Tao | |
| 6,580,456 B1 | 6/2003 | Jacobs | |
| 6,784,929 B1 | 8/2004 | Chen | |
| 7,304,676 B2 | 12/2007 | Compton et al. | |
| 7,365,785 B2 | 4/2008 | Hashimoto et al. | |
| 7,612,820 B2 | 11/2009 | Jacobs et al. | |
| 7,667,756 B2 * | 2/2010 | Suzuki | 348/312 |
| 2001/0017659 A1 | 8/2001 | Suzuki | |
| 2001/0050713 A1 | 12/2001 | Kubo et al. | |
| 2006/0250510 A1 | 11/2006 | Jacobs et al. | |
| 2007/0165128 A1 | 7/2007 | Kato | |
| 2008/0222441 A1 * | 9/2008 | Olofsson | 713/400 |
| 2009/0043974 A1 | 2/2009 | Suzuki | |

OTHER PUBLICATIONS

International Search Report and Written Opinion for International Patent Application No. PCT/US2012/024172, mailed May 21, 2012.
Buckley, Kevin, Selecting an Analog Front-End for Imaging Applications, Analog Dialogue vol. 34, No. 6, 5 pages, 2000.

* cited by examiner

*Primary Examiner* — James Hannett
*Assistant Examiner* — Angel L Garces-Rivera
(74) *Attorney, Agent, or Firm* — Knobbe, Martens, Olson & Bear, LLP

(57) ABSTRACT

Timing generators and methods of generating timing signals are disclosed. In one implementation, a timing generator for an imaging device includes a timing generator memory configured to store timing information, a timing core coupled to the timing generator memory and configured to read the timing information from the timing generator memory, and a processor core coupled to the timing core and configured to control a plurality of counters. The timing core can be further configured to generate a plurality of timing patterns based on the timing information and the plurality of counters. The timing generator can also be configured to generate a plurality of toggle positions for a plurality of timing signals based on the plurality of timing patterns.

24 Claims, 14 Drawing Sheets

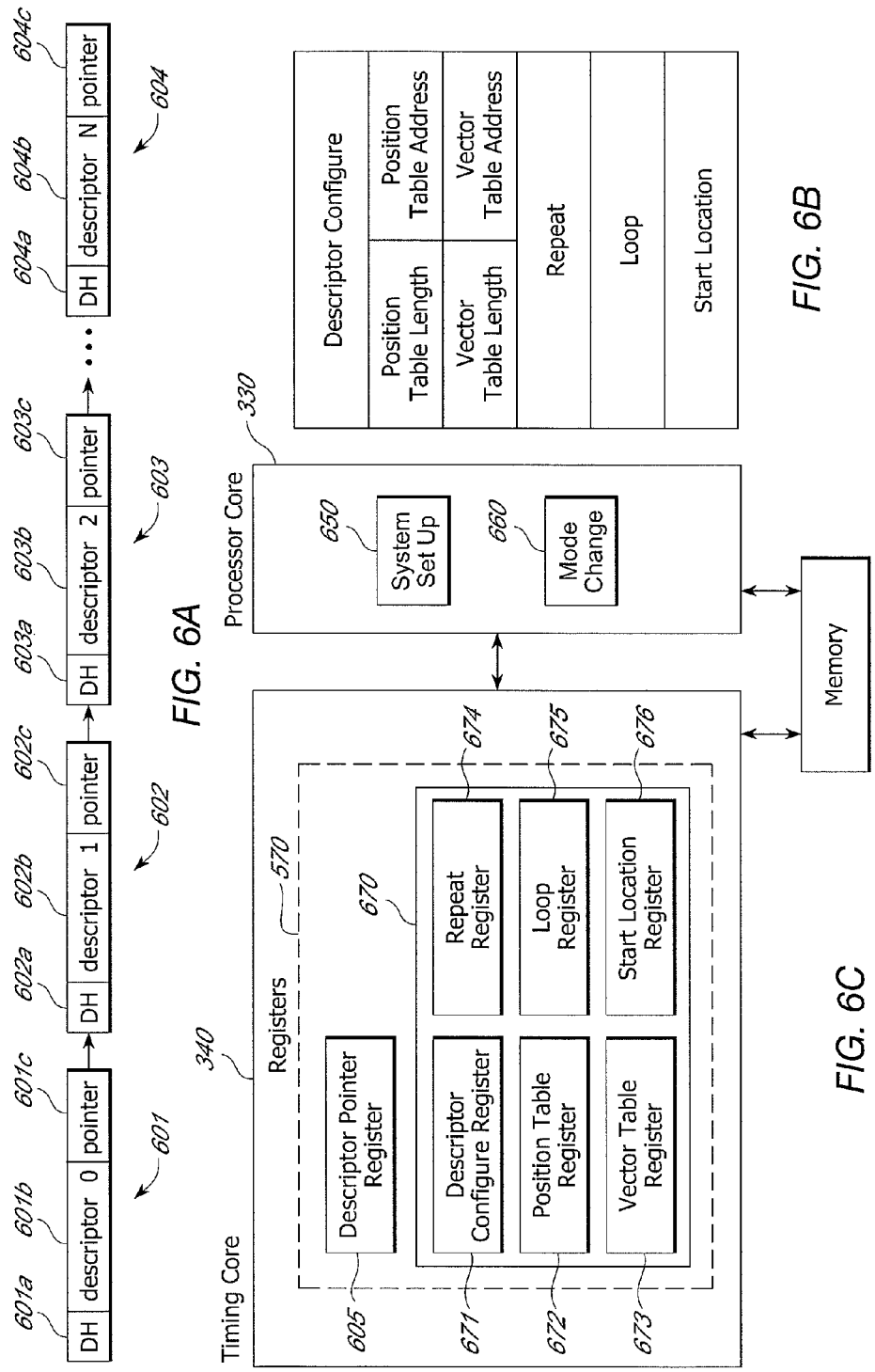

Pattern 0

| Vx Descriptor Configure | |
|---|---|
| Position Table Length = 5 | Position Table A Addr. |
| Vector Table Length = 5 | Vector Table B Addr. |
| Repeat = 0 | |
| Loop = 0 | |
| Start Location = 0 | |

| Vector Table B | |
|---|---|
| Vector Table Length = 5 | |
| V1A, V1B | |
| V2A, V2B | |
| V3A, V3B | |
| V 7 | |
| V 8A | |

| Position Table A | |
|---|---|
| Position Table Length = 5 | |
| 57 | |
| 30 | |
| 48 | |
| 2 | |
| 39 | |

Pattern 1

| Vx Descriptor Configure | |
|---|---|
| Position Table Length = 8 | Position Table C Addr. |
| Vector Table Length = 8 | Vector Table D Addr. |
| Repeat = 4 | |
| Loop = 0 | |
| Start Location = 57 | |

Vector Table D 1090

| Vector Table Length = 8 |
|---|
| V1A, V1B |
| V2A, V2B |
| V3A, V3B |
| V 4 |
| V 5 |
| V 6 |
| V 7 |
| V 8A |

FIG. 10B

Position Table C 1080

| Position Table Length = 8 |
|---|
| 99, 163 |
| 18, 136 |
| 36, 154 |
| 9, 54 |
| 27, 72 |
| 45, 90 |
| 63, 108 |
| 81, 145 |

FIG. 10C

| Vector Table Length = 4 |
|---|
| V1 |
| V2 |
| V3 |
| V4 |

*FIG. 11A*

| Position Table Length = 4 |
|---|
| 20 |
| 100 |
| 120 |
| 140 |

*FIG. 11B*

| Position Table Length = 3 |
|---|
| 20 |
| 80 |
| 20 |

*FIG. 11C*

TIMING GENERATOR AND METHOD OF GENERATING TIMING SIGNALS

BACKGROUND

1. Field

The technological field relates to generation of timing signals in an electronic device.

2. Description of the Related Technology

Imaging systems generally include an image sensor which is capable of capturing an image. The signal from the sensor is typically processed in the analog domain, converted to a digital signal, and further processed in the digital domain. Processing the image in the digital domain allows the image to be analyzed, manipulated and enhanced, prior to storage, display, transmission, and/or further processing.

Imaging applications typically involve three chips. The individual chips generally include an image sensor, an analog front-end (AFE), and a digital application specific integrated circuit (ASIC). The AFE conditions the analog signal received from the image sensor and performs the analog-to-digital (A/D) conversion. The digital ASIC contains image-processing and timing-generation circuitry. Additional application-specific circuitry following the digital image-processing ASIC can depend upon whether the imaging system is a camera, scanner, copier, etc.

An electronic image sensor may generally be configured as a solid-state device such as a charge coupled device (CCD) or a CMOS device. Generally, an image sensor enables the use of optics and electronics in order to process images. Each component of an image sensor generally uses a timing signal to control its operation. Therefore, a timing generator may generally be provided to provide the various timing signals to the components of the image sensor.

A timing generator is generally configured to generate timing signals based on a reference clock. The generated timing signals are then sent to the various components of the image sensor. A timing generator in many conventional systems is configured as a hardware device capable of providing the timing signals which correspond to the specific image sensor or other specific component within the camera unit. For example, image sensors which have different timing signal requirements are each provided with a particular timing generator capable of providing the required timing signals. As a result, there is a need to provide a timing generator which can be reconfigured to meet the requirements of different imaging devices.

Imaging devices which are produced by different manufacturers may be configured to use different timing signals for operation. The imaging device may also be capable of providing images in different formats. Each format may use different timing signals during the operation of the imaging device. A timing generator which is capable of being adapted to provide the timing signals for the imaging devices produced by different manufacturers or for producing images in different formats is therefore desirable.

According to some conventional examples, a programmable timing generator may be provided in order to provide the various timing signals of an image sensor. Other conventional timing generators are based on generation of fixed vertical/horizontal timing signals. However, some conventional timing generators rely on the hardware architecture of the timing generator to generate the timing signals. As a result, if there are defects in the timing generator, these defects would be corrected by redesigning the timing generator chip (IC). As a result, conventional timing generators can suffer from increased production costs and non-recurring engineering costs.

Furthermore, according to conventional programmable timing generators, an engineer can spend a large amount of time and resources in order to understand and program the timing generator based on the particulars of the image sensor. In order to program the timing generator according to the conventional examples, a user should understand the hardware structure of the programmable timing generator in order to reprogram the timing generator code. Therefore, the development of a timing program can be time consuming.

SUMMARY

The systems, methods and devices of the disclosure each have several innovative aspects, no single one of which is solely responsible for the desirable attributes disclosed herein.

According to one aspect, a method of generating timing signals in an imaging device is disclosed. The method includes retrieving a first descriptor timing information from a first descriptor data structure of a plurality of descriptor data structures, the plurality of descriptor data structures arranged in a linked list. The method further includes retrieving first timing information from a memory based on the first descriptor timing information, and generating at least one timing signal for the imaging device based at least in part on the first timing information.

According to another aspect, an apparatus is disclosed. The apparatus includes a processor core configured to retrieve a first descriptor timing information from a first descriptor data structure of a plurality of descriptor data structures. The plurality of descriptor data structures are arranged in a linked list. The apparatus further includes a timing core configured to retrieve first timing information from a memory based on the first descriptor timing information, and generate at least one timing signal based at least partly on the first timing information.

According to another aspect, a timing generator for an imaging device is disclosed. The timing generator includes means for retrieving a first descriptor timing information from a first descriptor data structure of a plurality of descriptor data structures, the plurality of descriptor data structures arranged in a linked list, means for retrieving first timing information from a memory based on the first descriptor timing information, and means for generating at least one timing signal based at least partly on the first timing information.

According to another aspect, a computer program product for processing data for a program configured to generate a plurality of timing signals is disclosed. The computer program product including a non-transitory computer-readable medium having stored thereon code for causing a computer to retrieve a first descriptor timing information from a first descriptor data structure of a plurality of descriptor data structures. The plurality of descriptor data structures arranged in a linked list. The computer program product further includes code for causing a computer to retrieve first timing information from a memory based on the first descriptor timing information, and generate at least one timing signal based at least partly on the first timing information.

BRIEF DESCRIPTION OF THE DRAWINGS

FIG. 6A illustrates an example of a descriptor based linked list that can be used in some implementations.

FIG. 6B illustrates an example of the format of descriptor timing information according to some implementations.

FIG. 6C is a block diagram illustrating some elements of a timing core, a processor core, and a memory in a timing generator.

FIGS. 9A-9C illustrate examples of a descriptor, a Vector Table, and a Position Table for representing a timing pattern shown in FIG. 8.

FIGS. 10A-10C illustrate examples of a descriptor, a Vector Table, and a Position Table for representing a timing pattern shown in FIG. 8.

FIG. 11A illustrates an example of a Vector Table according to some implementations.

FIGS. 11B-11C illustrate examples of a Position Table according to some implementations.

DETAILED DESCRIPTION OF EMBODIMENTS

Figure 1:
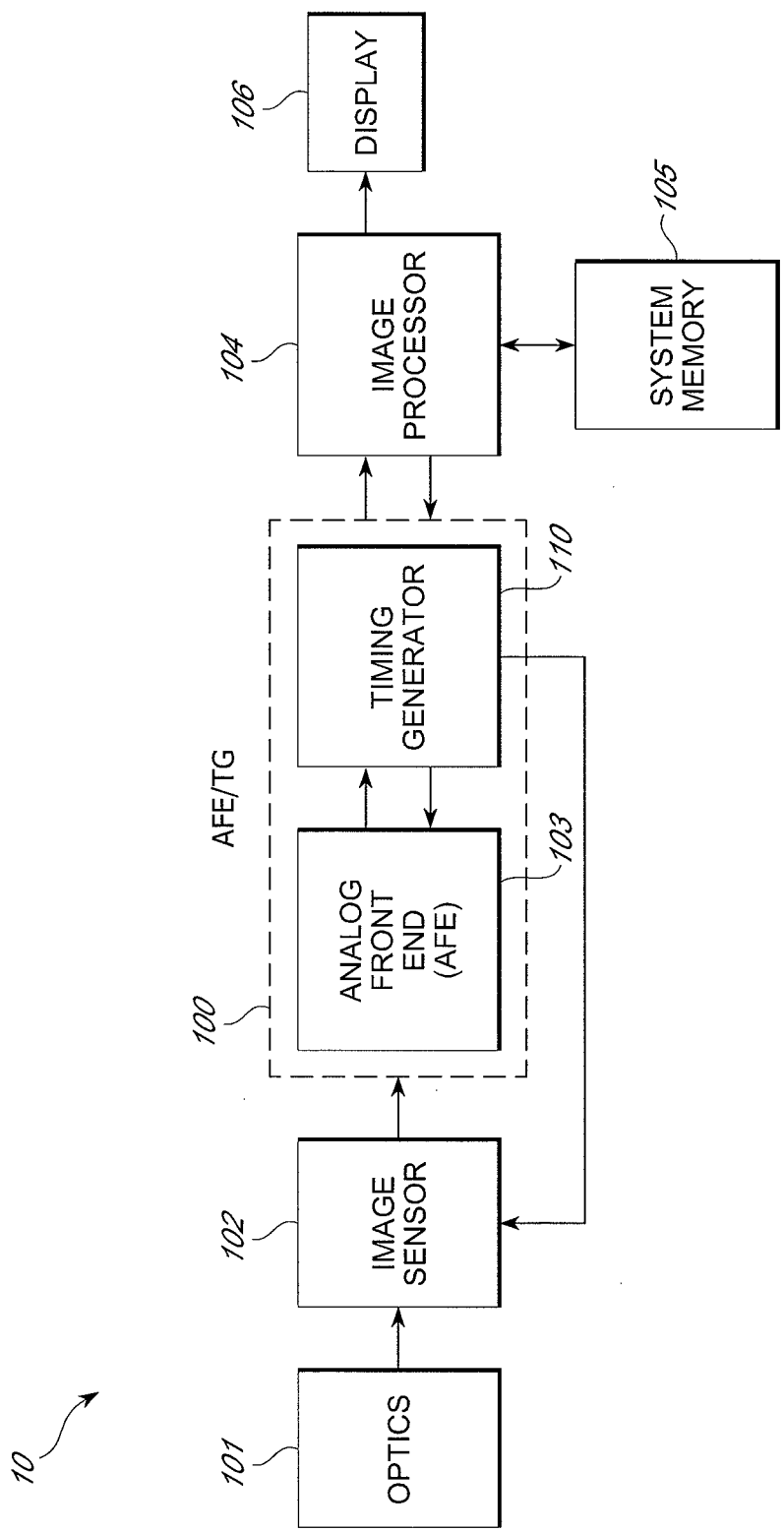
FIG. 1 is a block diagram illustrating an example of an imaging device (e.g., a camera) which includes a timing generator.

The following detailed description of certain embodiments presents various descriptions of specific embodiments of the invention. However, the invention can be embodied in a multitude of different ways as defined and covered by the claims. In this description, reference is made to the drawings where like reference numerals indicate similar elements.

Generally, an image sensor which may be incorporated in a camera requires various timing signals to operate the various components. A traditional programming model of a programmable timing generator for an imager sensor highly relies on the processor structure and design. That is, the timing signals to be generated are dependent on the particular architecture or language that the processor uses. Therefore, an engineer generally needs to understand the processor structure or the language of the processor in order to properly generate the required timing signals.

As the complexity and number of required timing signals increases, the burden of requiring a user, such as an engineer for a device maker, to understand the processor architecture and programming language likewise increases. According to some implementations, a system of generating timing signals for an image sensor is simplified such that an engineer does not need to understand the processor architecture or program language. This may be accomplished by splitting the timing signals to be generated into a set of timing patterns. Information regarding the toggle positions, or changes in the timing signals, for each timing pattern can be stored in memory. The memory can be linked such that timing signals can be pieced together based on the timing pattern information. A set of descriptors may be generated and stored in memory to describe the timing information, which is to be used by the timing generator. The descriptors may be programmed and adjusted by an engineer in order to suit the application of the timing generator in the device. As a result, an engineer is not required to understand the architecture of the processor or the programming language, but instead can generate the timing signals by describing a number of timing signals through a set of descriptors, storing individual timing pattern information, and linking the timing patterns to generate the timing signals. These functions may be performed by the engineer through an interface, such as a graphical user interface (GUI) tool. The GUI tool may collaborate with a flexible processor core of the timing generator. As a result, the GUI tool may be supported without knowledge of the register architecture of the timing generator and the processor core.

FIG. 1 is a block diagram illustrating an implementation of imaging device 10 which includes a timing generator. The imaging device 10 as used herein is a broad term that includes, for example, an electronic camera, video recorder, a web cam, a camera built into a portable or mobile computer, including but not limited to, a cellular telephone, smart phone, portable media player, personal digital assistant, a laptop, or a tablet computer. The imaging device 10 can include optics 101 and an image sensor 102. In this example implementation, and in some of the implementations described herein, the imaging device 10 is referred to as a camera for clarity of the description, but this is not intended to be limiting to a camera or any one type of imaging device. The image sensor 102 can be, for example, a charge-coupled device (CCD) or a complementary metal-oxide semiconductor (CMOS) sensor. The sensor 102 may be coupled to a combined analog front-end (AFE)/timing generator (TG) illustrated as AFE/TG 100.

The imaging device 10 can also include an analog first end (AFE) 103 that can be configured to convert an analog signal produced by the sensor 102 to a digital image. The AFE 103 may include various components, for example, an input clamp circuit (not shown) which can restore an analog DC level of the signal to a desired point within the supply range of the AFE 103. An AFE 103 that is intended to operate with charge-coupled devices (CCDs) may include a correlated double sampler (CDS). In some implementations, the correlated double sampler (CDS) can take two samples of each pixel of the image sensor 102. The two samples may correspond to, for example, a sample at the reset level and one at the video level. In some implementations, the correlated double sampler (CDS) can perform a differential measurement between the two samples. AFEs in some implementations that are configured for other image sensors (such as contact image-sensors (CIS) or focal plane arrays (FPA) may include a sample-hold amplifier (SHA) in place of a correlated double sampler (CDS).

A gain amplifier (e.g., PGA or VGA, not shown) may receive the signal from the CDS and amplify the signal and better utilize the full dynamic range of an A/D converter (ADC) within the AFE 103. A high-speed ADC converts the conditioned analog image signal to the digital domain, allowing for additional processing by an image processor 104.

As illustrated in FIG. 1, the AFE 103 is coupled to the TG 110. The AFE 103 and the TG 110 may be integrated as a single chip or an integrated circuit (IC). The TG 110 is further coupled to the image sensor 102 and the image processor 104, and is configured to provide the AFE 103 and the image sensor 102 with timing signals for operating and synchronizing these components as will be described below.

Still referring to FIG. 1, the image processor 104 is further coupled to a system memory 105 and a display 106. The image processor 104 controls the processing of the digital image received from the AFE/TG 100. The image processor 104 further controls the storage and display of the processed image. The system memory 105 may be configured as any storage media device. For example, the system memory 105 may include a tape drive, a disk drive, such as a floppy disk drive, hard disk drive, optical disk drive or magneto-optical disk drive, or an integrated circuit card or chip with flash, RAM, ROM, and/or EEPROM. The system memory can include multiple memory units, and any one of the memory units may be configured to be within the camera or may be external to the camera. For example, the system memory 105 may include a ROM memory containing system program instructions stored within the camera. The system memory may also include memory cards or high speed memories configured to store captured images which may be removable from the camera.

The image processor 104 may be further configured to control the display 106 to display the captured image. The display 106 may be external to the imaging device 10 or may be part of the imaging device 10. The display 106 may also be configured to provide a view finder for a user prior to capturing an image, or may be configured to display a captured image stored in memory or recently captured by the user.

The image processor 104 may execute instructions stored in the system memory 105 and may communicate the instructions to the timing generator 110 to generate the specified timing signals. Program instructions may be stored in the system memory 105 (e.g., a read-only-memory or a RAM memory).

The image sensor 102 outputs information representative of an image in the form of analog signals corresponding to a beam of light sensed by each cell of the image sensor based on the generated timing signals. The AFE 103 may convert or sample the analog signals to digital form based on dedicated timing signals generated for operation of the AFE 103 by the timing generator 110.

Figure 2:
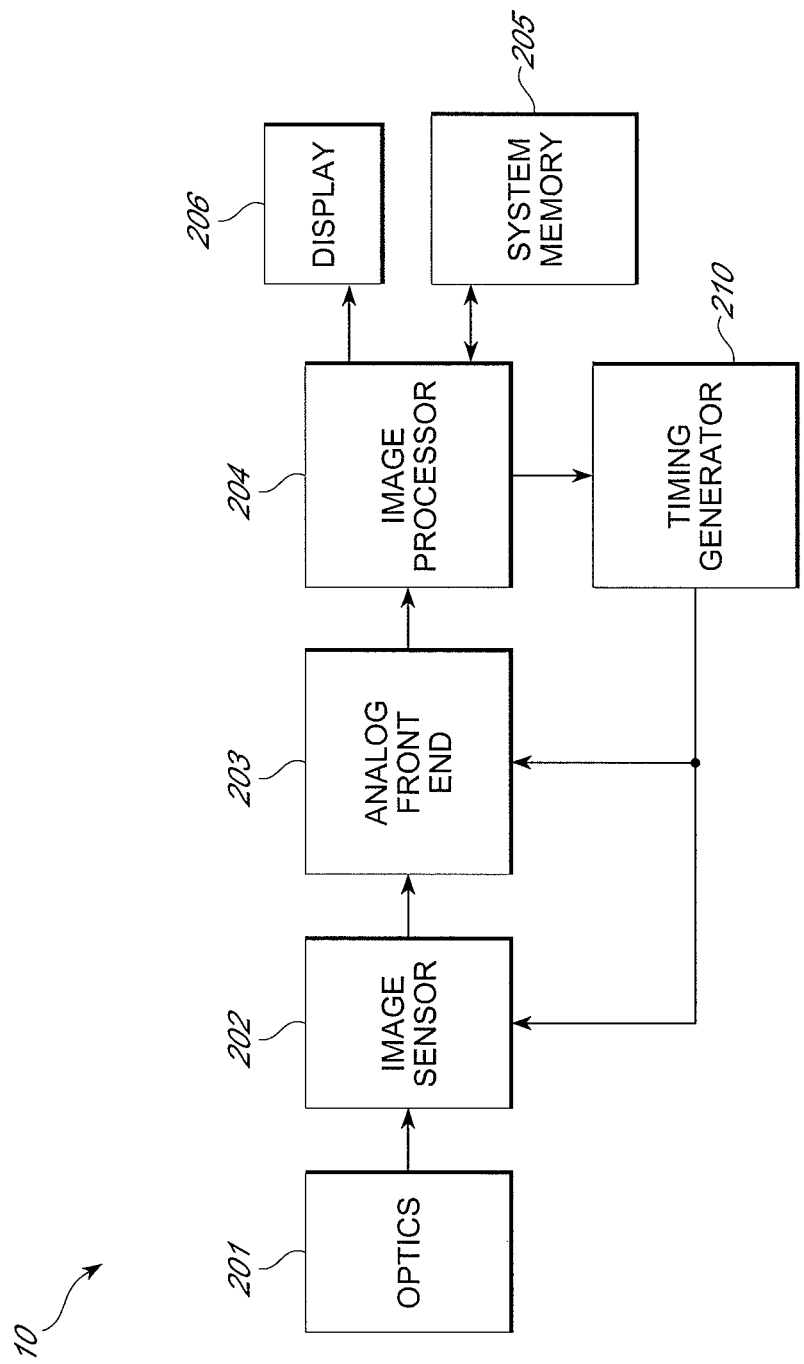
FIG. 2 is a block diagram of an imaging device which includes a timing generator.

FIG. 2 is a block diagram illustrating an example of an imaging device 10 which includes a timing generator, according to some implementations. The imaging device 10 illustrated in FIG. 2 may include optics 201, image sensor 202, an analog front end (AFE) 203, an image processor 204, a system memory 205, a display 206 and a timing generator (TG) 210. The operation of these various components can be similar (or the same) as that discussed with respect to FIG. 1 above, and therefore another description of these components is omitted for clarity. The imaging device 10 of FIG. 2 differs from that of FIG. 1 in that the TG 210 can be provided as a separate component from the AFE 203. One having ordinary skill in the art will also recognize that in some implementations, the components of the imaging device 10 may be integrated and may be provided as a single chip or IC, or may be provided as multiple IC's each including any number of the components.

Figure 3:
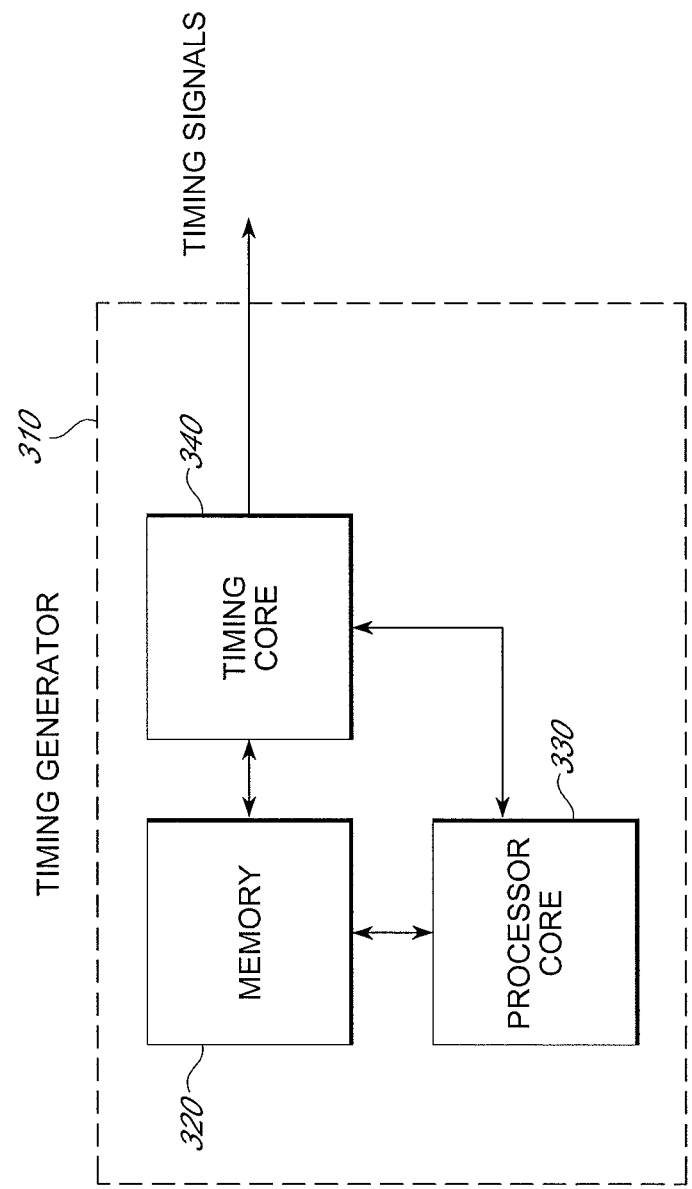
FIG. 3 is a block diagram illustrating an example of a timing generator.

FIG. 3 is a block diagram illustrating an example of a timing generator 310, according to some implementations. The timing generator 310 of FIG. 3 illustrates an example of the timing generators 110 and 210 illustrated in FIGS. 1 and 2 respectively. The timing generator 310 may include a timing generator memory 320, a timing core 340, and a processor core 330, which are all in electrical communication. The timing core 340 can be configured to read timing information from the timing generator memory 320. The processor core 330 may be coupled to the timing core 340 and programmed (or configured) to control a plurality of counters. The plurality of counters may include counters 543, 544, and 545 illustrated in FIG. 5B, which will be described in greater detail below. The plurality of counters may correspond to the pixels of the image sensor. The processor core 330 may also be programmed to perform a system configuration of the timing generator 310, set the registers of the timing core 340, and perform a mode change of the timing generator 310. The system configuration and/or mode change operations may communicate with the timing core 340 information regarding the specified timing signals based on the timing requirements of the imaging device 10.

The processor core 330 may further be programmed to cooperate with the timing core 340 in order to mask (or disable) some of the output of the timing core 340 depending on the system requirements or mode. The processor core 330 may also communicate with the timing core 340 in order to change the register setup of an analog front end based on a generated timing pattern. Furthermore, the processor core 330 may cooperate with the timing core 340 to control a low-voltage differential signaling (LVDS) interface, and to control word generation for synchronization. The processor core 330 may also perform a system debugging operation of the timing generator 310, and may also control and set the registers of the timing core 340 during timing generation to control the operation of the timing core 340. The functionalities of the processor core 330 are not limited to those described. Rather, the processor core 330 may be programmed to perform any number of processing operations for a timing generator 310.

The timing core 340 may be further configured to generate a plurality of timing patterns based on timing information and information regarding the plurality of counters as will be described below. The timing core 340 may be configured to generate a plurality of toggle positions for a plurality of timing signals based on the plurality of timing patterns. The toggle positions may correspond to a rising or falling edge of a timing signal. For example, a toggle position may correspond to a rising edge at which the timing signal transitions from a low state to a high state. The timing generator 310 may output the generated timing signals to an image sensor and an AFE 103 of the imaging device 10.

Figure 4:
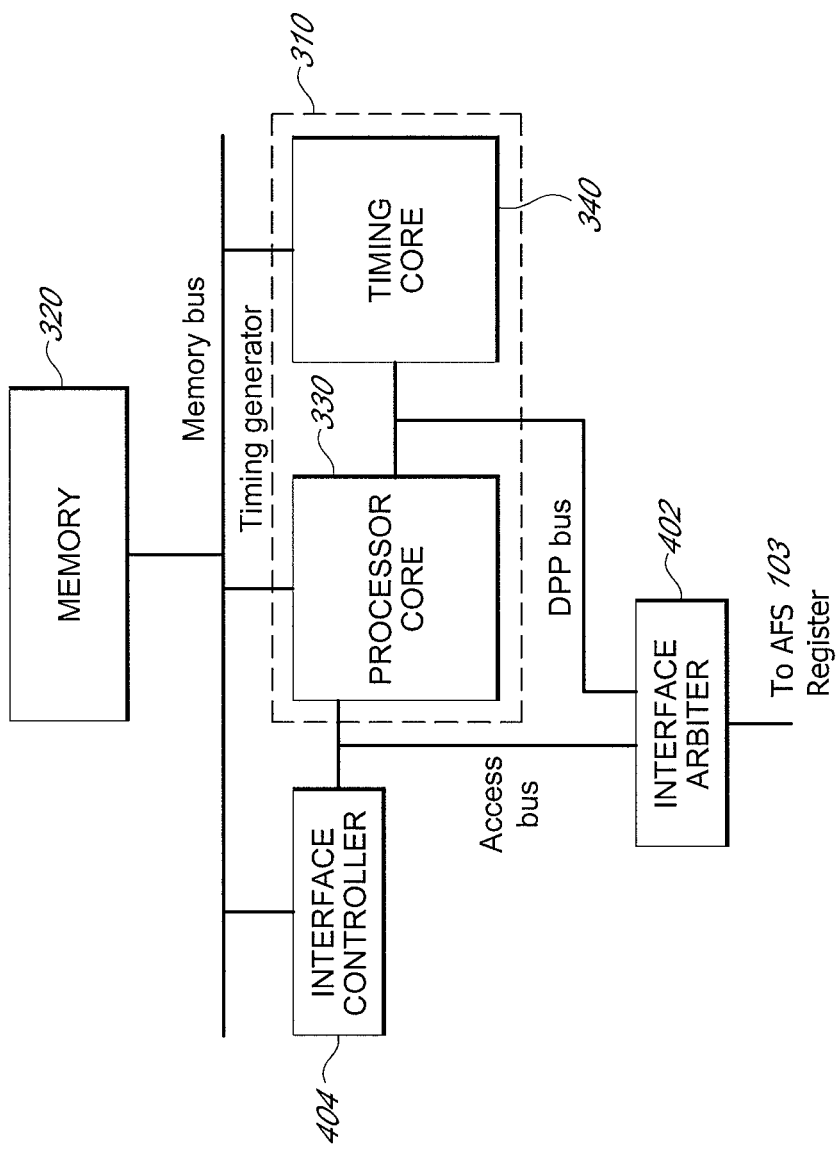
FIG. 4 is a block diagram illustrating an example of a timing generator.

FIG. 4 is a block diagram illustrating an example of a timing generator 400 that can be used in the imaging devices described herein, according to some implementations. A timing generator core 310 may be configured as a dual-core, and may include a processor core 330 and a timing core 340. The operation of the processor core 330 and the timing core 340 of FIG. 4 can be similar to those described with respect to the processor core 330 and a timing core 340 of FIG. 3, and an explanation of which is omitted for clarity.

The timing core 340 may communicate with the processor core 330 through a digital pattern processor (DPP) bus as illustrated in FIG. 4. The timing generator 310 may be further provided with an interface arbiter 402 for scheduling and aiding the communication between the processor core 330, the timing core 340, and other components of the imaging device 10 including the AFE 103. The timing generator 310 may further include a timing generator memory 320 for storing timing information and information for programming the processor core 330. The information for programming the processor core 330 may include the software code for programming the processor core 330 to control the timing signal generation of the timing core 340. The timing generator memory 320 may be configured as a local volatile memory, for example, having a smaller size than the system memory 105 of the imaging device 10. Furthermore, the timing generator memory 320 may be positioned outside of the timing generator IC, and be coupled to the timing generator IC, or may be part of the timing generator IC as illustrated in FIG. 3 by timing generator memory 320.

Still referring to FIG. 4, an interface controller 404 may be provided to aid and schedule communication through the access bus between the timing generator components and other components of the imaging device 10. For example, the interface controller 404 may be configured to load information from a main system memory 105 on system reset or power up, and store the information in the timing generator memory 320. In the case of a volatile memory, the timing generator memory 320 is cleared of information when an imaging device is powered off. However, the information remains stored in main system memory 105 of the imaging device 10, which has a large capacity relative to the timing generator memory 320. Upon system power-up, the interface controller 404 may be configured to load timing information and software code for programming the processor core 330 from the system memory 105 and store the information to the timing generator memory 320 through the memory bus. This information may include timing information, including the descriptors, vector tables, and position tables, for generating the timing signals as will be discussed below. Each of the processor core 330 and timing core 340 may be configured to communicate with the timing generator memory 320 through the memory bus.

Figures 5, 5A:
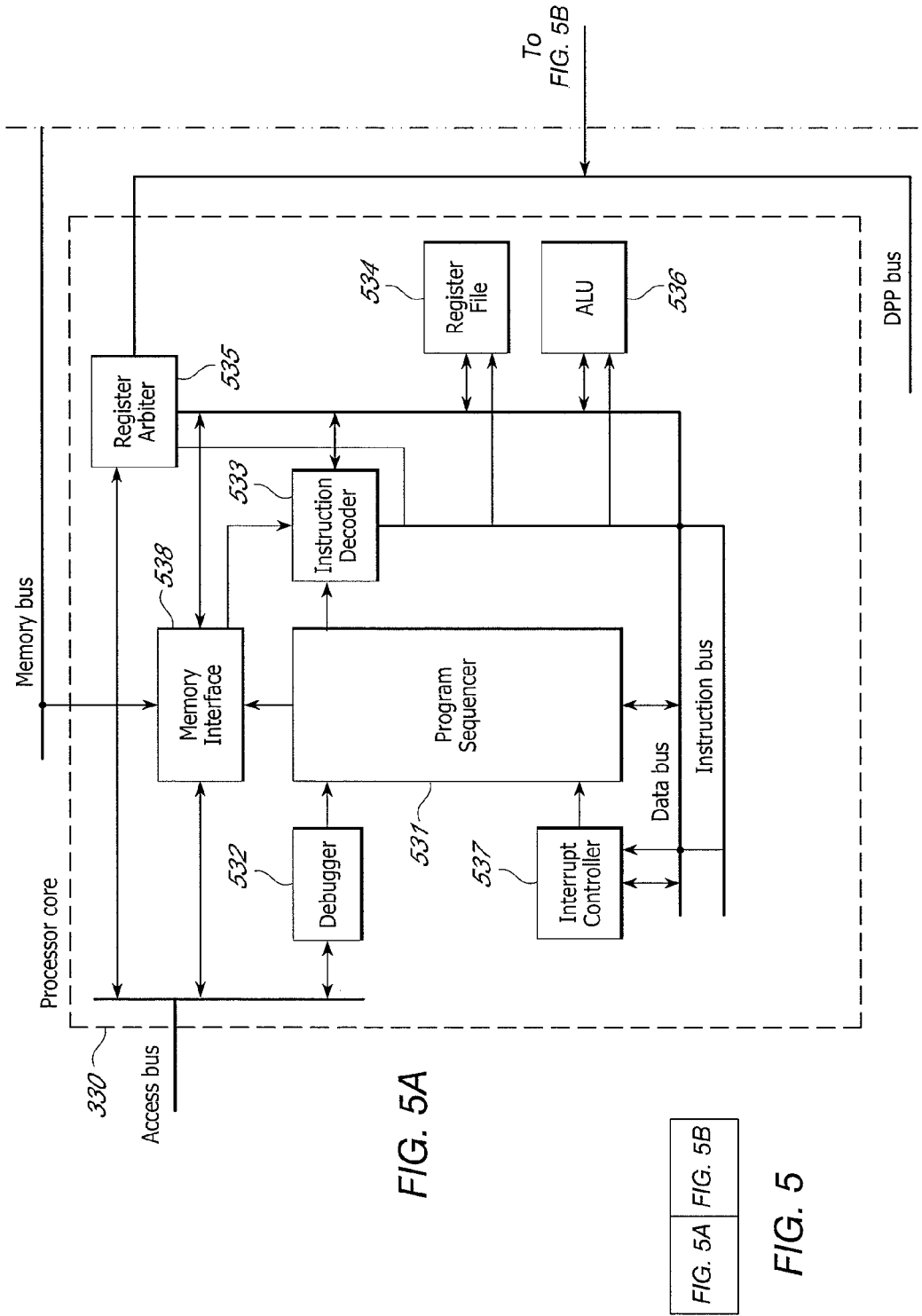
FIGS. 5A-5B are block diagrams illustrating an example of a processor core and a timing core in a timing generator.

FIG. 5 is a block diagram illustrating an example of a processor core 330 and a timing core 340 in a timing generator 310 that can be used in imaging devices (e.g., cameras) according to some implementations. With reference to FIG. 5A, the processor core 330 can include a program sequencer 531, a debugger 532, an instruction decoder 533, a register file 534, a register arbiter 535, an ALU 536, an interrupt controller 537, and a memory interface 538. The program sequencer 531 may be configured to control the execution of the timing program instructions of the timing generator. The program sequencer 531 may receive the control signals through the instruction bus and may receive data through the data bus. In order to improve the efficiency of the processor core 330, a 16-bit reduced instruction set may be designed to achieve a small code size. However, the instruction set is not limited thereto.

A memory interface 538 may be coupled to the access bus, the data bus, and the memory bus and may be configured to communicate and fetch data from a timing generator memory 320 through the memory bus. The instruction decoder 533 can be coupled to the memory interface 538 to receive program instructions for the timing generator, and decode the program instructions. The instruction decoder 533 may be configured to provide the decoded instructions through an instruction bus and a data bus. The register arbiter 535 may be coupled to an access bus, the data bus, and the DPP bus, and may be configured to schedule and aid communication between the processor core 330 and the timing core 340. For example, the register arbiter 535 may be configured to communicate with a register of the timing core 340, and may reset or configure the timing core 340 register based on control signals from the program sequencer 531. The register arbiter 535 may also provide control signals to various components of the timing core 340 through the DPP bus.

Still referring to FIG. 5A, program sequencer 531 may be configured to store the address of the program instruction to be executed or the address of the program instruction which is to be executed next. An interrupt controller 537 may be coupled to the data bus and the instruction bus and may be capable of interrupting the program sequencer in order to perform a particular task based on a condition existing in the processor core 330 or timing core 340. An arithmetic logic unit (ALU) 536 may be coupled to the data bus and instruction bus and may be configured to provide data regarding the operation of the counters of the timing core to the register arbiter 535 through the data bus.

Figure 5B:
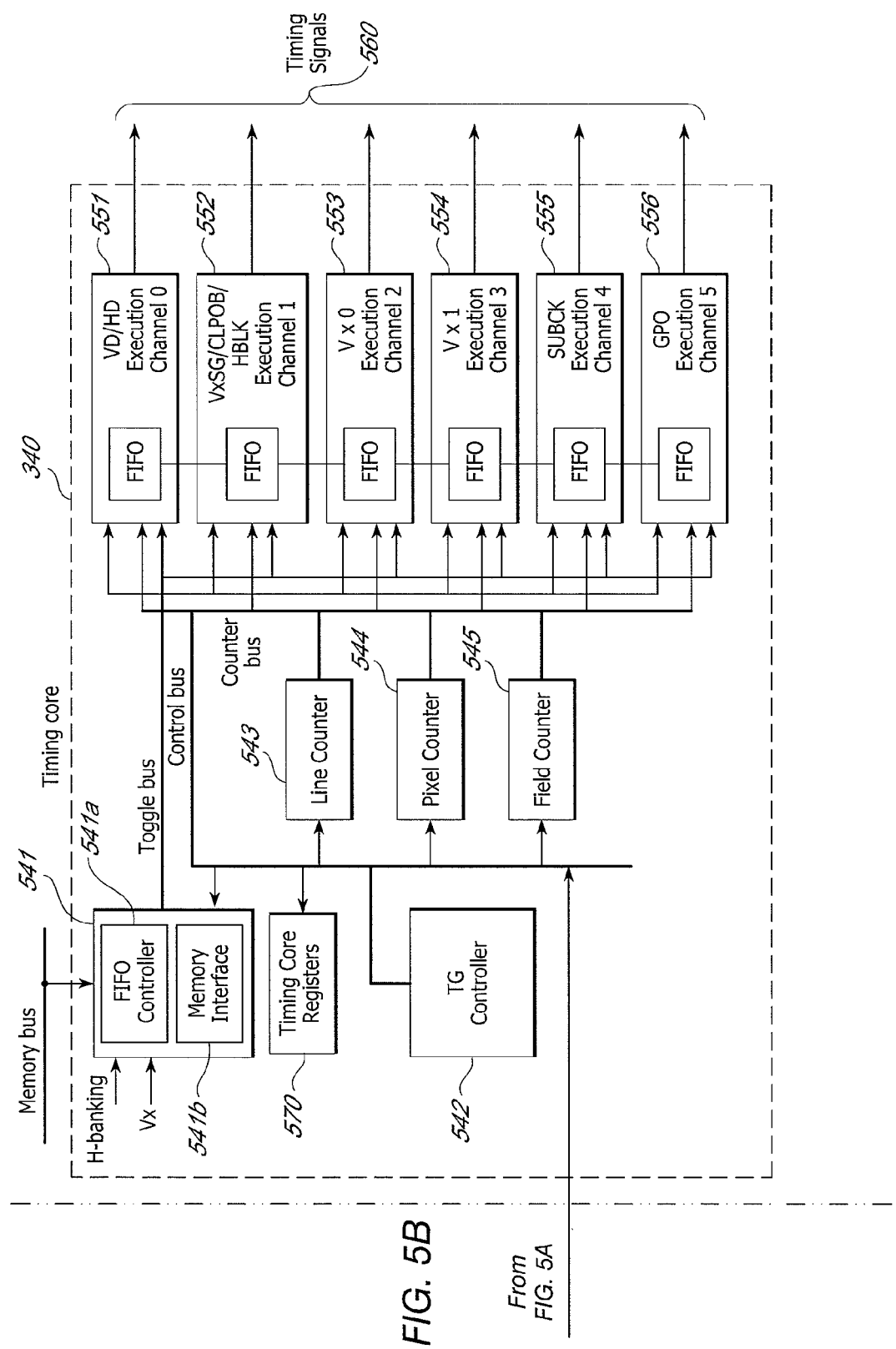

The timing core 340 illustrated in FIG. 5B includes a timing core memory unit 541 coupled to a Toggle Bus and a Control Bus, a timing generator controller 542 coupled to the Control Bus, a line counter 543, a pixel counter 544, and a field counter 545 all coupled to the Control Bus and Counter Bus. The timing core 340 also includes timing signal communication units 551-556 coupled to the FIFO controller 541a, and the Counter Bus, the Control Bus and the Toggle Bus. Timing core registers 570 are also provided for storing timing information as will be discussed below, and are coupled to the Control Bus. The timing core memory unit 541 may include a FIFO controller 541a and a memory interface 541b.

The memory interface 541b may be configured to load or fetch timing information from a timing generator memory 320 through the memory bus. For example, the memory interface 541b is configured to load a set of descriptors for describing the timing signals to be generated from the timing generator memory 320. The descriptors to be loaded may be communicated to the memory interface 541b by the processor core 330 through the Control Bus. The timing core registers 570 may then be set by the timing generator controller 542 based on the descriptor information loaded from timing generator memory 320.

Based on the information of the timing core registers 570, timing information for generating particular timing signals may be loaded to FIFO units of the timing signal communication units 551-556. This operation will be described in greater detail with reference to FIGS. 8-10 below. The memory interface 541b may fetch a small portion of the timing information from the timing generator memory 320, during generation of the timing signals. Furthermore, the FIFO controller 541a may be configured to monitor an H-blanking signal in order to determine whether to fetch memory from timing generator memory 320. An H-blanking signal is a signal which is used to control the start of image data read-out from a an image sensor 102 by the imaging device 10. When an H-blanking signal transitions to a high signal, the signal indicates that an image data read-out operation is occurring. In response, the memory interface 541b discontinues loading timing information from the timing generator memory 320. As a result, noise in images which are displayed subsequent to the image data read-out operation may be reduced.

Additionally, the FIFO controller 541a may be configured to monitor a Vx signal in order to determine whether to access timing generator memory 320. The Vx signal may correspond to any of the timing signals 560 generated by the timing core 340. As a result, a user, such as an engineer for a device maker, may configure the FIFO controller 541a to signal to the memory interface 541b that a loading of memory should be discontinued based on the Vx signal. As a result, memory is not loaded during the period in which particular timing signals corresponding to the Vx signal are being generated.

The FIFO controller 541a may also monitor the amount of space available in the FIFO units of timing signal communication units 551-556, and the status of the memory bus. Since each of the monitored events described above may occur randomly, the loading of memory from the timing generator memory 320 is randomized. As a result, the timing core 340 may reduce delay or noise that results in loading large amounts of timing information while generating the timing signals in the timing core 340. Furthermore, loading large amounts of data generally interferes with the simultaneous operation of the processing components by introducing noise or interference in the system. The use of a small size timing core 340 memory loading operation described above also reduces or eliminates this noise/interference.

The TG controller 542 illustrated in FIG. 5B can be configured to communicate timing signal control instructions to the timing signal communication units 551-556 through a Control Bus. The counters 543-545 are configured to communicate a count value corresponding to the position of the pixel in image sensor during a read-out operation. For example, the pixel counter 544 may begin at 0 and may be reset to 1 at the end of each line of an array. The line counter 543 may similarly begin at 0 and may be reset to 1 at the end of each field or frame in the image array. In one embodiment, the field counter 545 may begin at 0, increment at the end of each field, and may be reset when a maximum field value is reached. An array may be configured to include, for example, 4000 pixels in a line, 500 lines in a field, and 6 total fields, in a 12 Megapixel array.

The timing core memory unit 541 may communicate the loaded timing information to the timing signal communication units 551-556 through a Toggle Bus. The information provided through the Toggle Bus may be used with the information of the Counter Bus in order to generate the timing signals. For example, the timing signals may be generated to toggle at toggle positions provided in the timing information through the Toggle Bus at count positions which are provided by the counters 543-545. The count positions generated by the counters 543-545 are provided to the timing core 340 through the Counter Bus. The generation of the various timing signals based on the count positions and the toggle positions will be described in greater detail below with reference to FIGS. 8-10.

Each of the timing signal communication units 551-556 may be configured to generate the timing signals through operation of the FIFO controller 541a, the control information provided though the Control Bus, the timing information provided though the Toggle Bus, and the counter information provided through the Counter Bus. Each of the timing signals 560 may be provided on separate communication channels (e.g., 0-5) to the components of a camera or other imaging device. For example, VD/HD channel of timing signal communication unit 551 may provide a VD signal to indicate the start of a field, and an HD signal to indicate the start of a line. The Vx0 and Vx1 channels of timing signal communication units 553-554 may each provide 30 timing signals to an image sensor in order to shift data to and from the image sensor. The VxSG/CLPOB/HBLK channel of timing signal communication unit 552 may be used to generate various internal signals, including for example 15 VxSG signals which are combined with Vx0 or Vx1 signals to provide three-level signals to the AFE/TG 100 device pins. SUBCK channel 555 may provide a SUBCK signal used to control the exposure time of the imaging device 10. GPO channel 556 provides general purpose output signals for the imaging device 10. One of skill in the art will recognize that the number of timing signals 560 and the number of communication/execution channels is not limited to any particular number.

In the descriptor based timing generator, the timing programming model and multichannel structure support a multiple timing file compression approach. Therefore, the generated timing file is reduced in size and the system performance is enhanced.

The generation of the timing signals will now be described in greater detail with reference to FIGS. 6-10. The timing generator may be configured as a linked list descriptor-based timing pattern generator. As illustrated in FIG. 6A, the timing information may be provided in the form of a number of descriptors, which can point to one another in a linked list. For example, descriptor data structure 601 may include a header 601a identifying an address of descriptor 0 in the linked list and timing information 601b corresponding to descriptor 0. The descriptor data structure 601 also includes a pointer 601c to the next descriptor (i.e., 602) in the linked list. Each descriptor data structure 602-604 may include similar information corresponding to the particular descriptor. The linked list is not limited to any number of descriptors, and may be configured to include any number of descriptors used to generate the timing signals. Furthermore, any number of descriptors may point to a descriptor within a linked list such that the descriptors may be used to describe any number of timing patterns to generate the timing signals.

With reference to FIG. 6B, FIG. 6B illustrates an example of the format of descriptor timing information according to some implementations. The descriptor timing information includes a descriptor configure entry, which describes the various entries of the descriptor timing information.

The descriptor timing information also includes information regarding a Position Table and a Vector Table. The Vector Table includes identifiers of particular timing signals, while the Position Table includes corresponding toggle positions of the particular timing signals to be generated. The descriptor timing information includes a Position Table length, and a Position Table address in timing generator memory 320. Similarly, the descriptor timing information includes a Vector Table length and a Vector Table address in timing generator memory 320. The descriptor timing information may also include repeat information, corresponding to the number of times that a timing pattern is repeated, and loop information corresponding to the number of times that multiple patterns are repeated. The descriptor timing information also includes a start location of the timing pattern to be generated.

The descriptor configure entry may include information on the format or mode of the descriptor timing information. For example, the descriptor configure entry may include information on whether the descriptor timing information includes a repeat or loop number entry. The descriptor configure entry may also include information describing the mode of timing signal generation. For example, the descriptor configure entry may include information describing when a triggering event occurs for the start of a timing pattern. A triggering event may correspond to the start of a field by monitoring a VD signal, or may correspond to the start of a line by monitoring an HD signal. Once a triggering event occurs, the timing core 340 may be configured to generate the timing signal patterns in sequence following the triggering event. Alternatively, the mode may be set such that a single timing pattern is generated in response to a triggering event, and a subsequent timing pattern is generated at a next triggering event.

Additionally, the descriptor configured entry can include information regarding an offset of timing pattern generation in relation to a triggering event. For example, the start of a timing pattern may effectively be offset from the triggering event based on the information of the offset included in the descriptor configure such that the timing pattern is generated at a predetermined position following the triggering event.

The descriptor configure may also include information describing the format of the timing information to be loaded from memory. For example, the descriptor configure may include information on whether the toggle position entries of a Position Table are provided as absolute or relative values. The distinction between absolute and relative values will be discussed in greater detail with reference to FIGS. 11A-11C below.

Other information may also be included in the descriptor configure, such as whether the timing pattern is a start pattern of a loop sequence, and whether the offset position corresponds to each repetition of a timing pattern, or a subset of repetitions of the timing pattern. One of ordinary skill in the art will recognize that other information may be included based on the application of the timing generator 310. The configurations of the timing signal generation may be determined by a user, such as an engineer for a device maker, by defining the descriptor configure entry such that timing signal generation programming is adaptable to the particular application of the timing generator 310.

With reference to FIG. 6C, a timing core 340 may store timing information in a timing core register 570 in the form of a descriptor pointer register 605, and a descriptor register set 670. The descriptor register set 670 includes a descriptor configure register 671, a Position Table register 672, a Vector Table register 673, a repeat register 674, a loop register 675, and a start location register 676 for storing corresponding information of the descriptor timing information described with reference to FIG. 6B above. Timing information is loaded from a timing generator memory 320 based on the information of the descriptor register set 670. The timing information is loaded in small amounts to reduce interference or noise during generation of the timing signals, and the loading operation may be controlled by FIFO controller 541*a* as discussed above. A processor core 330 may be programmed to communicate with the timing core 340 to control the operation of the timing core 340, including setting the registers of the timing core 340. For example, the processor core 330 can set the values of the descriptor register set 670 and the descriptor pointer register 605 to control the generation of timing signals by the timing core 340. The processor core 330 can run a program to implement a system setup 650 and mode change 660. The processor core 330 may be programmed to control the operation of the counters and registers of the timing core 340 as discussed above.

The timing information (i.e., 601*b*, 602*b*, 603*b*, 604*b*) provided in the descriptor data structures (i.e., 601-604) is used to load a Vector Table and a Position Table from timing generator memory 320 to FIFO units of the timing signal communication units 551-556. For example, a timing core 340 may use the address of a Position Table and the address of a Vector Table to load the corresponding Position Table and Vector Table to a particular FIFO of timing signal communication units 551-556 to generate a timing pattern. Each descriptor pointer (i.e., 601*c*, 602*c*, 603*c*, 604*c*) may point to the next descriptor data structure (i.e., 601-604) in a linked list in order to load the next Position Table and Vector Table for describing a next pattern of the timing signals as will be described below with reference to FIGS. 8-10.

Figures 7A, 7B:
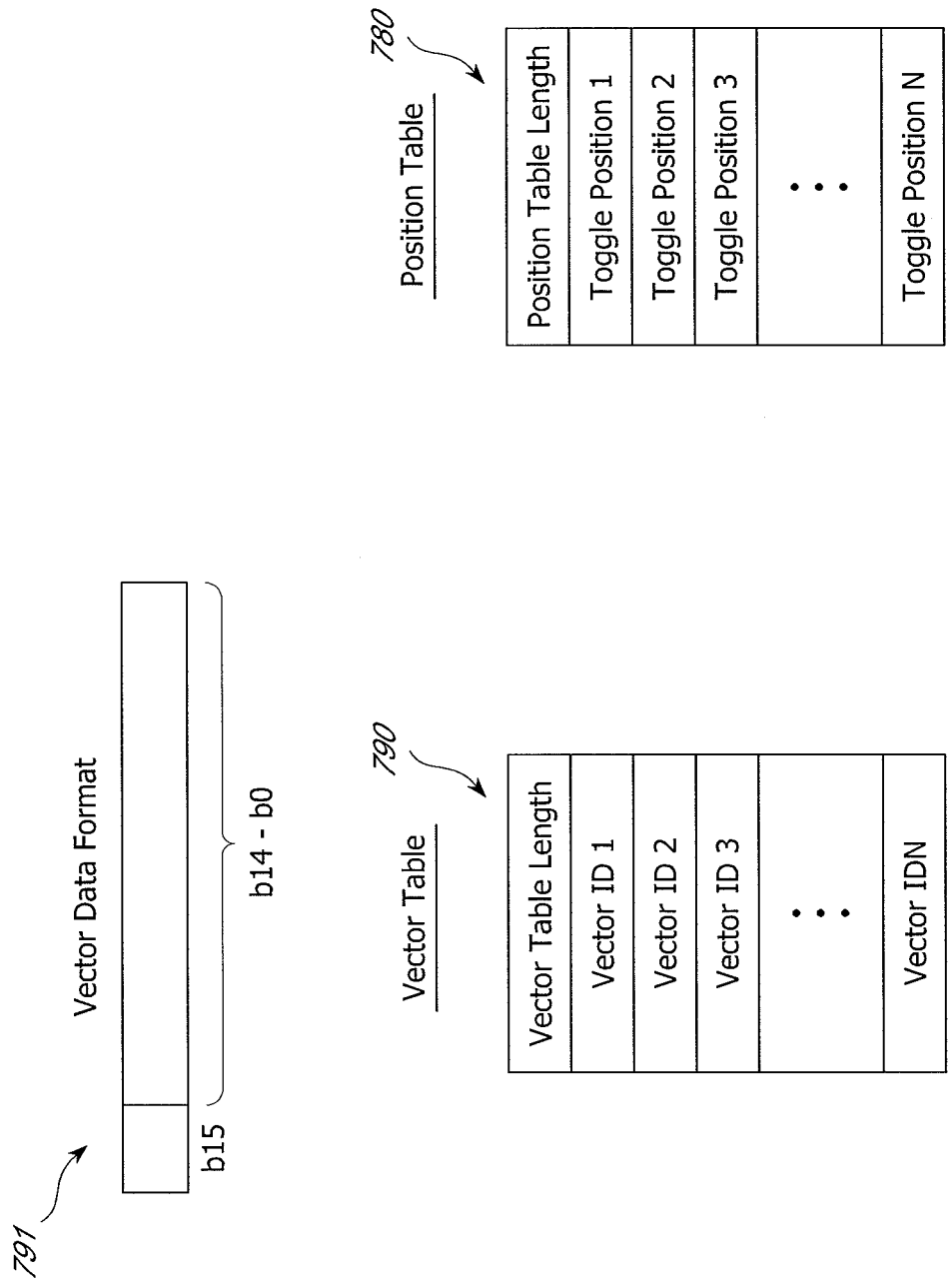
FIGS. 7A-7B illustrate an example of a Vector Table and a Position Table.

FIGS. 7A and 7B illustrate an example of a Vector Table and a Position Table according to some implementations. As illustrated in FIG. 7A, a Vector Table 790 may include a Vector Table length, and vector entries which identify timing signals V1-VN. Each vector entry may be formatted as a 16 bit entry as illustrated by vector data entry 791. A bit (for example, b15) may include page information of the vector entry, while the remaining bits (for example, b14-10) may identify the timing signals to be toggled. A page may be set to 0 or 1 to indicate different pages of the vector entry information. As a result, up to 30 timing signals may be identified by each vector table entry.

As illustrated in FIG. 7B, a Position Table 780 includes a position table length entry, and toggle position information corresponding to the entries of the Vector Table 790. For example, the Vector Table 790 may identify vector signal V1 as a first entry of Vector Table 790. The Position Table 780 may include a toggle position corresponding to the entry of the Vector Table 790. The timing signal V1 may be toggled at a count position corresponding to the toggle position 1. As a result, each timing pattern for generating a plurality of timing signals can be described by using both the Vector Table 790 and the Position Table 780 as well as the counter information generated by the timing core 340 as previously described.

Figure 8:
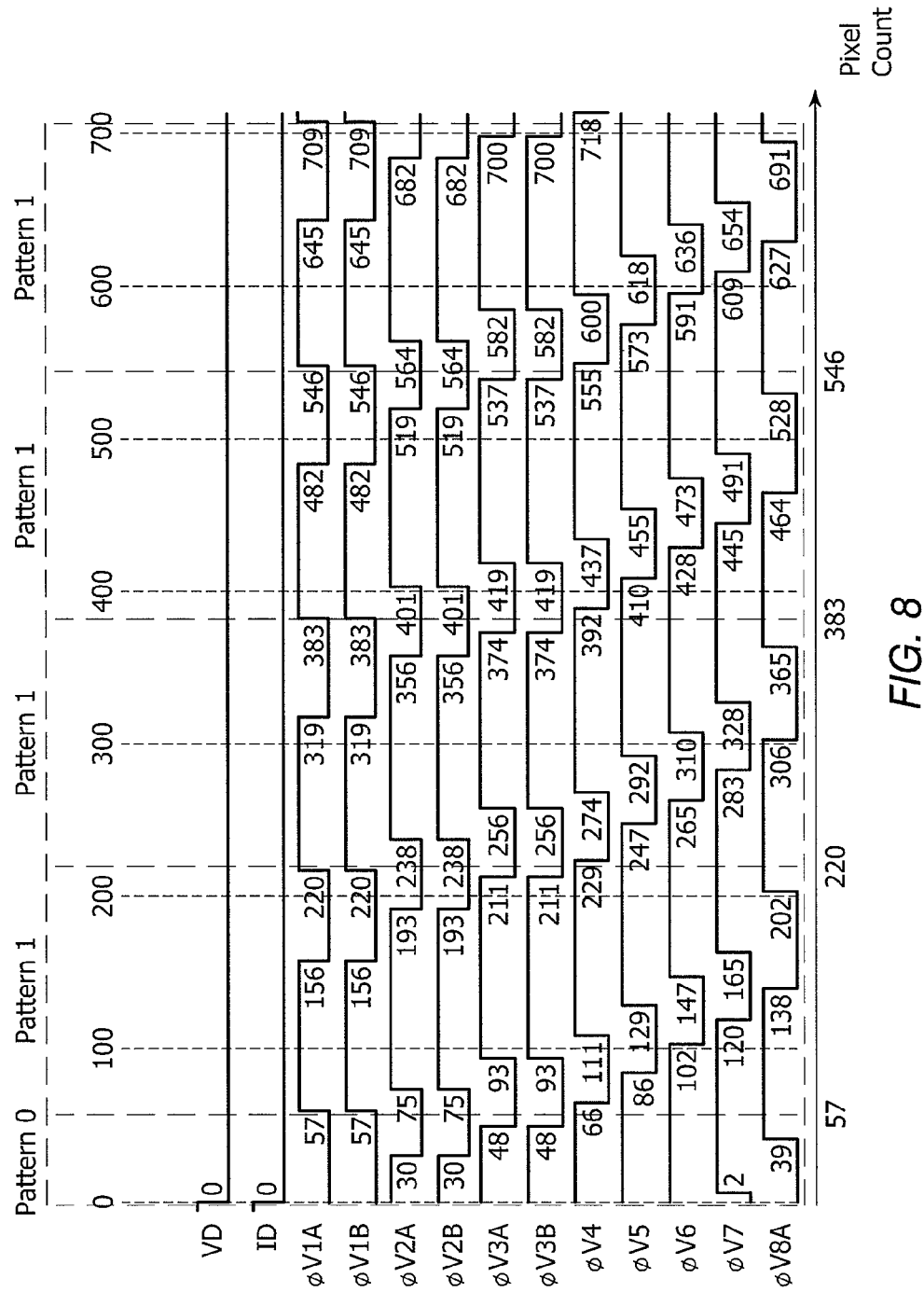
FIG. 8 illustrates an example of a set of timing signals, according to some implementations.

FIG. 8 illustrates an example set of timing signals of a timing generator 310. A person of skill in the art will recognize that the timing signals illustrated in FIG. 8 are only exemplary, and the present invention is not limited to any number of timing signals, timing patterns, or timing signal toggle positions.

The timing signals illustrated in FIG. 8 include V1A, V1B, V2A, V2B, V3A, V3B, V4, V5, V6, V7, and VBA. Timing signals V1A-V8A may correspond to vertical timing signals for shifting data during image read-out. As illustrated in FIG. 8, the timing signals may be split into repeating patterns of toggled timing signals. For example, the timing signals of FIG. 8 may be represented as pattern 0 and pattern 1. The patterns may be described by the descriptors in order to generate the various timing signals.

FIGS. 9A-9C illustrate a descriptor timing information 601*b*, a Vector Table 990, and a Position Table 980 corresponding to pattern 0 of FIG. 8. The descriptor timing information 601*b* includes information in the format of a Vx descriptor, as indicated by the descriptor configure entry. As a result, the timing signals generated correspond to Vx timing signals. The descriptor timing information 601*b* also includes information identifying a length and address of Position Table A, and Vector Table B to be loaded from the timing generator memory 320. For example, the address of Position Table A and Vector Table B is used by the FIFO controller 541*a* to load timing information from the timing generator memory 320 to the FIFO units of a Vx timing signal communication unit (i.e., 553, 554, of FIG. 5B). The "repeat" and "loop" information in the descriptor timing information 601*b* includes the number of times that the pattern is repeated, and the number of times that a set of patterns is looped in generating the timing signals. For example, pattern 0 may be repeated 0 times and a sequence of patterns may be looped 0 times, which indicates that pattern 0 does not repeat or loop within a frame of the generated timing signals as illustrated in FIG. 8. The start location information indicates the count position at which the pattern of timing signals is generated. For example, with reference to FIG. 8, pattern 0 may start at count position 0.

Illustrated in FIG. 9B, a Vector Table B can include Timing Signal IDs representing timing signals V1A-V8A. Position Table A 980 includes corresponding toggle positions of the timing signals V1A-V8A. Each of the timing signals may be represented by the timing information included in the descriptor timing information 601*b*, Vector Table B, and Position Table A for the period corresponding to pattern 0.

For example, with reference to FIG. 8, timing pattern 0 corresponds to a time period that extends from pixel count 0 to 57. The pixel count can be determined by inspecting the contents of the pixel counter 544, the line counter 543, and the field counter 545 as previously discussed. A timing signal may be generated by toggling a particular timing signal at a toggle position corresponding to the pixel count information and the toggle position information read from the Position Table. For example, Vector Table B 980 may identify timing signals V1A-V1B as a first entry. Position Table A 990 may include a toggle position of 57. As a result, the timing signals V1A-V1B are toggled at pixel count 57 as illustrated in FIG. 8. Similarly, timing signals V2A-V2B may be toggled at a toggle position of 30, timing signals V3A-V3B may be toggled at a toggle position of 48, timing signal V7 may be toggled at a toggle position of 2, and timing signal V8A may be toggled at a toggle position of 39. Timing signals V4-V6 are not toggled during the time period corresponding to pattern 0. Therefore, timing signals V4-V6 are not included in the Vector Table B 980 and have no corresponding toggle position information.

Descriptor 0 illustrated in FIG. 9A may further point to descriptor 1 as illustrated in FIG. 10A through a descriptor pointer 601c as illustrated in FIG. 6 in order to further generate the timing signals. FIGS. 10A-10C represent a descriptor timing information 602b, a Vector Table D 1090, and a Position Table C 1080 corresponding to pattern 1 of FIG. 8. A descriptor timing information 602b may include information in the format of a Vx descriptor, as indicated by the descriptor configure entry. As a result, the timing signals generated correspond to Vx timing signals. The descriptor timing information 602b also includes information identifying a length and address of Position Table C, and Vector Table D to be loaded from the timing generator memory 320.

The "repeat" and "loop" information in the descriptor timing information 602b includes the number of times that the pattern is repeated, and the number of times that the set of patterns is looped in generating the timing signals. For example, pattern 1 may be repeated 4 times and a sequence of patterns may be looped 0 times, which indicates that the patterns do not repeat or loop within a frame of the generated timing signals as illustrated in FIG. 8. The start location information indicates the count position at which the pattern of timing signals is generated. For example, with reference to FIG. 8, pattern 1 may start at count position 57. The vector address may include the address of a Vector Table or a portion of a Vector Table to be read from the timing generator memory to the timing core memory 320. Similarly, the position address may include an address of a Position Table or a portion of a Position Table to be loaded from the timing generator memory 320 to the timing core memory (i.e., FIFO units of timing signal communication units 551-556). As illustrated in FIG. 10A, the vector address may correspond to a Vector Table D, and the position address may correspond to a Position Table C.

With reference to FIG. 10B, a Vector Table D 1090 may include timing signal IDs representing timing signals V1A-V8A. With reference to FIG. 10C, Position Table C 1080 includes corresponding toggle position information. Each of the timing signals may be represented by the timing information included in the descriptor timing information 602b, Position Table C, and Vector Table D, for the period corresponding to pattern 1.

For example, with reference to FIG. 8, timing pattern 1 corresponds to a time period that initially extends from pixel count 57 to 220, and which is then repeated such that pattern 1 is repeated a total number of 4 times. The pixel count can be determined by inspecting the contents of the pixel counter 544, the line counter 543, and the field counter 545 as previously discussed. A timing signal may be generated by toggling the timing signal at a toggle position corresponding to the pixel count information and the toggle position information read from the Position Table. For example, Vector Table D 1090 may identify timing signals V1A-V1B in a first entry. Position Table C 1080 may include a toggle position of 99 and 163 at a corresponding entry. As a result, the timing signals V1A-V1B are toggled at pixel count 156 (99+57) and 220 (163+57) as illustrated in FIG. 8. Similarly, the timing signals V2A-V2B may be toggled at toggle position 18 and 136, the timing signals V3A-V3B may be toggled at toggle positions 36 and 154, the timing signal V4 may be toggled at toggle position 9 and 54, the timing signal V5 may be toggled at toggle positions 27 and 72, the timing signal V6 may be toggled at timing position 45 and 90, the timing signal V7 may be toggled at toggle positions 63 and 108, and timing signal V8A may be toggled at toggle positions 81 and 145.

Each of the toggle positions may correspond to a count which begins at the end of the previous pattern. For example, pattern 1 is subsequently repeated at count positions 220, 383, and 546. The toggle positions of Position Table D may correspond to toggle positions that are offset by the pattern start count. For example, timing signals V1A-V1B may subsequently be toggled at pixel count 319 (220+toggle position 99) and pixel count 383 (220+toggle position 163). The pattern repeat sequence may be initiated following the last toggle position provided in the Position Table entries for the particular pattern.

The examples described above with respect to FIGS. 9C and 10C may be provided in the form of a Position Table based on an absolute toggle position format or relative toggle position format. In the case of absolute toggle position format, the Position Table includes single toggle position entries corresponding to the timing signal entries of the Vector Table. The toggle position entries are arranged in increasing order, based on absolute values, such that the last toggle position corresponds to a count position at the end of the timing signal pattern. Alternatively, the toggle positions may be provided in a relative position format. A relative position format lists the toggle positions based on the previous entry of the Position Table. The distinction will be described in greater detail with reference to FIGS. 11A-11C. FIG. 11A illustrates an example of a Vector Table according to some implementations. FIGS. 11B-11C illustrate examples of a Position Table based on an absolute toggle position format, and a relative toggle position format respectively. With reference to FIG. 11A, a Vector Table may identify timing signals V1, V2, V3 and V4 as timing signal entries. A corresponding Position Table, as illustrated in FIG. 11B, may provide a set of toggle position entries at toggle positions of 20, 100, 120, and 140. The toggle positions of FIG. 11B are provided in an absolute value format. The same toggle positions may be provided in a relative toggle position format as 20, 80, and 20, as illustrated in FIG. 11C. Since the last two entries of the absolute value Position Table are each offset by 20, the last entry is eliminated in describing the timing signals in a relative toggle position value format. As a result, the Position Table of FIG. 11C is reduced in size by one entry from the Position Table of FIG. 11B. The timing core 340 may be configured to recognize that the format of the Position Table is provided as relative toggle position values through descriptor configure provided in the descriptor. As a result, the timing core 340 may generate the toggle positions of timing signal V4 based on the offset 20 provided in the last entry of the Position Table.

Figure 12:
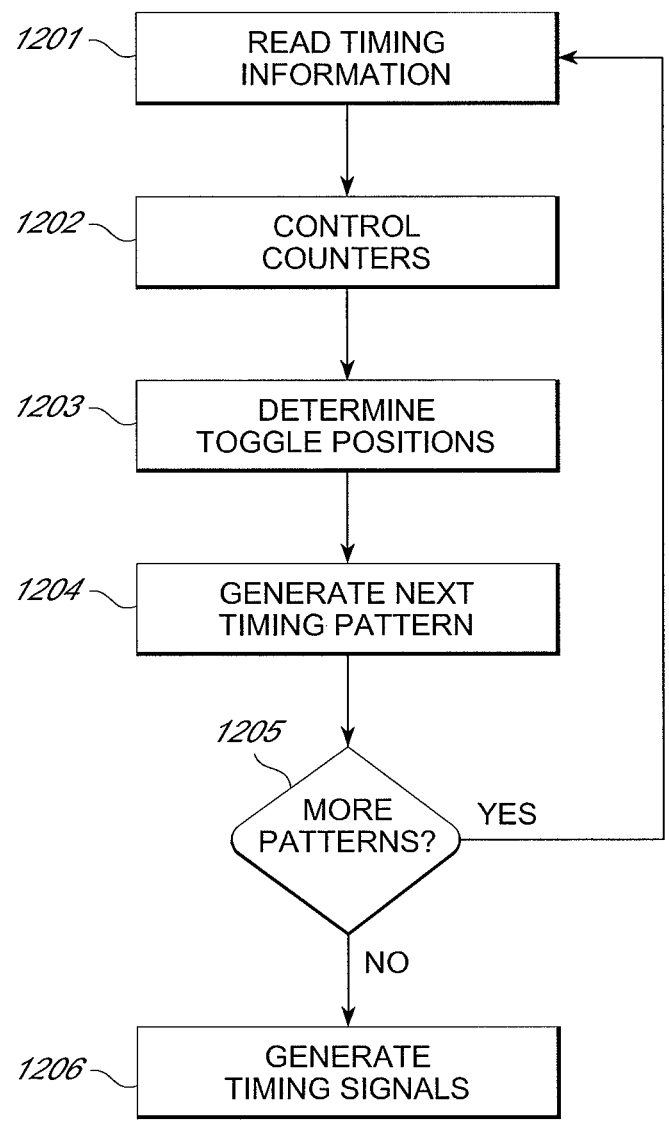
FIG. 12 illustrates a flowchart of an example of a method of generating timing signals.

FIG. 12 represents a flowchart of a method of generating timing signals according to some embodiments. The illustrated method can be modified in a variety of ways. For example, in another embodiment, various portions of the illustrated process can be combined, arranged in an alternate sequence, removed, or the like. As illustrated by block 1201, the method may begin by reading timing information. The timing information may be read from a timing generator memory and may be provided to a timing core memory. As illustrated by block 1202, a plurality of counters which are configured to count a pixel position of an image sensor may be controlled. As illustrated by block 1203, toggle positions for a plurality of timing signals within a timing pattern may be determined based on the timing information and the counter information. As illustrated by block 1204, a next timing pattern may be generated based on the determined toggle positions. The method may then determine whether there are additional timing patterns to be generated as illustrated by decision block 1205. For example, the method may determine whether a descriptor includes a pointer to next descriptor in the linked list, or if the descriptor is the last descriptor for describing the timing signals. If more patterns are to be generated, the method may return to block 1201 in order to read the timing information indicated in the descriptor. If there are no remaining patterns to be generated, the timing signals may be generated and output to the various components of the imaging device 10.

Figure 13:
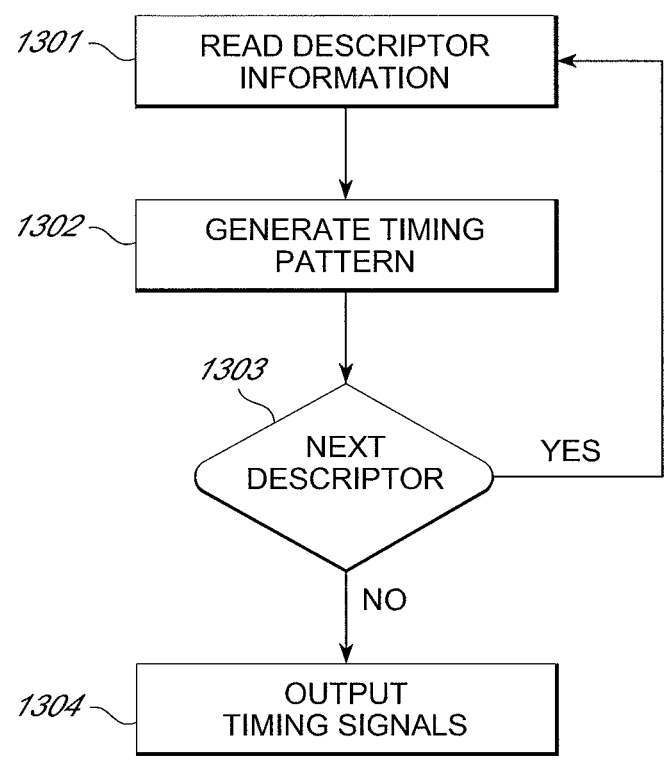
FIG. 13 illustrates a flowchart of an example of a method of generating timing signals according to some implementations.

FIG. 13 illustrates a flowchart of a method of generating timing signals according to some embodiments. As represented by block 1301, the method may begin by reading the descriptor information. A timing pattern corresponding to the descriptor information may be generated as illustrated by block 1302. The method may then determine if a next descriptor exists in the linked list as illustrated by decision block 1303. If the current descriptor points to a next descriptor in the linked list, the method returns to block 1301 and a next descriptor information is read. If the current descriptor represents the last descriptor for describing the timing signals, the method proceeds by outputting the timing signals as illustrated by block 1304.

As discussed above, a traditional programming model of a programmable timing generator for CCD or CMOS imager sensor relies highly on the processor structure and design. Therefore, an engineer for a device maker generally should understand the processor structure, the instruction set, and be familiar with the programming skill of assembly language. Furthermore, traditional programmable timing generators use a large memory size to store the timing file of CCD/CMOS imager sensor. Furthermore, a CCD/CMOS imager application is generally a very noise sensitive application in a traditional programmable timing generator due to the periodical memory fetch that introduces fixed pattern noise into the image. In addition, a GUI tool can be difficult to develop for a traditional timing generator architecture due to the software overhead associated with coding in a particular processor's language or in assembly language.

For a descriptor-based timing generator, a linked list descriptor-based timing pattern programming model can be used. By using this programming model, an engineer for a device maker may focus on the timing pattern itself without having to understand the hardware structure and processor instruction details. In this descriptor-based timing generator, a dual core structure is described, which includes a processor core 330 and a timing core 340. The processor core 330 can handle the system setup and mode switch, and the timing core 340 can handle the timing generation. By employing this structure, the descriptor-based timing pattern can be directly mapped to a timing core for timing generation. Therefore, complex software development is obviated.

Furthermore, as discussed above, a FIFO and internal signal control may be created to ensure that there is no memory access during data read out. As a result data is fetched and loaded into FIFO in advance, thereby reducing the introduction of noise to the system. Furthermore, a mechanism to ensure that memory access is randomized may be created such that no fixed pattern noise is typically generated.

Furthermore, in a dual core architecture of a timing generator, a processor core and timing core are provided. The flexible or variable portion of timing generation in CCD/CMOS application may be operated in the processor core 330 and the structured timing generation may be operated in the timing core 340. Because of the advanced hardware/software partition, the software overhead may be eliminated and GUI support is easily implemented.

As a timing core, multiple timing generation channels may be supported. As a result the complicated CCD/CMOS imager sensor timing may be supported and the system may be highly scalable. For each timing generation channel, absolute position pulse generation, relative position pulse generation, timing pattern repeat and timing sequence loop and other functions are supported to make the timing generation much more efficient and make the code size in memory much smaller. Additionally, the timing information stored as Vector Tables and Position Tables may be reused by defining timing signals through descriptors, as a result the amount of memory for storing the timing information may be reduced. According to some embodiments, the code size in memory may be reduced to ¼ the size of conventional program codes.

In order to avoid a memory access conflict between the processor core 330 and the timing core 340, a dual bank memory structure may be designed. A pre-emptive based round robin arbitration scheme may be designed to support efficient memory fetching for loading data to the timing core memory units (i.e., FIFO memories included in 551-556) and the processor core 330.

Thus, a skilled artisan will appreciate that the configurations and principles of the embodiments can be adapted for any other electronic system. The circuits employing the above described configurations can be implemented into various electronic devices or integrated circuits. Examples of the electronic devices can include, but are not limited to, consumer electronic products, parts of the consumer electronic products, electronic test equipment, healthcare monitors, etc. Further, the electronic device can include unfinished products.

The foregoing description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits is not adversely affected).

Although this invention has been described in terms of certain embodiments, other embodiments that are apparent to those of ordinary skill in the art, including embodiments that do not provide all of the features and advantages set forth herein, are also within the scope of this invention. Moreover, the various embodiments described above can be combined to provide further embodiments. In addition, certain features shown in the context of one embodiment can be incorporated into other embodiments as well. Accordingly, the scope of the present invention is defined only by reference to the appended claims.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, cores, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, cores, and circuits described in connection with the aspects disclosed herein and in connection with FIGS. 1-5 may be implemented within or performed by an integrated circuit (IC), an access terminal, or an access point. The IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. The logical blocks, modules, cores, and circuits may include antennas and/or transceivers to communicate with various components within the network or within the device. A general purpose processor may be a microprocessor, but in the alternative, the processor may be any processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. The functionality of the modules or cores may be implemented in some other manner as taught herein. Furthermore, the functionality described herein (e.g., with regard to one or more of the accompanying figures) may correspond in some aspects to similarly designated "means for" functionality in the appended claims.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The functions described may be implemented in hardware, software, firmware, or any combination thereof. If implemented in software, the functions may be stored on or transmitted over as one or more instructions or code on a tangible, non-transitory computer-readable medium. Computer-readable media includes both computer storage media and communication media including any medium that facilitates transfer of a computer program from one place to another. A storage media may be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. A computer-readable medium may be in the form of a non-transitory or transitory computer-readable medium. Also, any connection may be properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. In summary, it should be appreciated that a computer-readable medium may be implemented in any suitable computer-program product.

The above description is provided to enable any person skilled in the art to make or use embodiments within the scope of the appended claims. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. A processor-implemented method of generating timing signals for an imaging device, the method comprising:

retrieving a first descriptor timing information from a first descriptor data structure of a plurality of descriptor data structures, the plurality of descriptor data structures arranged in a linked list;

retrieving first timing information from a memory based on the first descriptor timing information; and generating at least one timing signal for the imaging device based at least in part on the first timing information, wherein the first timing information comprises first vector information and first position information, and wherein the first vector information comprises a first vector table, and the first position information comprises a first position table, and wherein the first vector table lists at least one timing signal identifier, and the first position table lists at least one toggle position of a timing signal corresponding to the vector identifier.

2. The method of claim 1, further comprising:
retrieving a first descriptor pointer from the first descriptor data structure, the first descriptor pointer comprising an address of a second descriptor data structure in the linked list;
retrieving a second descriptor timing information from the second descriptor data structure of the plurality of descriptor data structures based on the first descriptor pointer;
retrieving second timing information from the memory based on the second descriptor timing information; and
generating the at least one timing signal based at least partly on the first timing information and the second timing information.

3. The method of claim 2, wherein a first portion of the at least one timing signal is generated based on the first timing information, and a second portion of the at least one timing signal is generated based on the second timing information.

4. The method of claim 2, wherein retrieving the second descriptor timing information is based at least in part on a size of the first descriptor timing information and available space in a FIFO buffer.

5. The method of claim 1, further comprising:
controlling a plurality of counters;
determining at least one toggle position based on the plurality of counters and the first timing information;
generating a first timing pattern based on the determined at least one toggle position; and
generating the at least one timing signal based on the first timing pattern.

6. The method of claim 1, wherein the first descriptor timing information comprises an address of the first timing information in the memory, and retrieving the first timing information from the memory comprises reading a portion of timing information from the memory corresponding to the address of the first timing information in the memory.

7. The method of claim 1, further comprising:
generating a first timing pattern based on the first timing information; and
generating a plurality of timing signals based on the first timing pattern.

8. The method of claim 7, wherein each of the plurality of descriptor data structures comprises a pointer to a next descriptor data structure corresponding to a next timing pattern, and generating the plurality of timing signals comprises generating the plurality of timing signals based on the first timing pattern and the next timing pattern.

9. The method of claim 1, further comprising retrieving timing information from a timing generator memory and storing the timing information in a timing core memory based on at least one of the available space of the timing core memory, a status of a memory bus, and a status of the timing core control process.

10. The method of claim 1, further comprising:
retrieving timing information from a system memory of the imaging device; and
storing the timing information to the timing generator memory upon system power-up.

11. The method of claim 1, wherein the at least one timing signal comprises a plurality of timing signals, the method further comprising transmitting the plurality of timing signals over a plurality of communication channels.

12. The method of claim 1, wherein retrieving first timing information from the memory comprises automatically fetching in advance timing data from the memory.

13. An apparatus comprising:
a processor core configured to retrieve a first descriptor timing information from a first descriptor data structure of a plurality of descriptor data structures, the plurality of descriptor data structures arranged in a linked list; and
a timing core configured to
retrieve first timing information from a memory based on the first descriptor timing information;
control a plurality of counters;
determine at least one toggle position based on the plurality of counters and the first timing information;
generate a first timing pattern based on the determined at least one toggle position; and
generate at least one timing signal based at least partly on the first timing information and the first timing pattern.

14. The apparatus of claim 13, wherein the processor core is further configured to retrieve a first descriptor pointer from the first descriptor data structure, the first descriptor pointer comprising an address of a second descriptor data structure in the linked list, and wherein the timing core is further configured to
retrieve a second descriptor timing information from the second descriptor data structure of the plurality of descriptor data structures based on the first descriptor pointer;
retrieve second timing information from the memory based on the second descriptor timing information; and
generate the at least one timing signal based at least partly on the first timing information and the second timing information.

15. The apparatus of claim 14, wherein a first portion of the at least one timing signal is generated based on the first timing information, and a second portion of the at least one timing signal is generated based on the second timing information.

16. The apparatus of claim 13, wherein timing core comprises a descriptor register set configured to store descriptor timing information, and wherein the descriptor timing information includes vector information and position information for generating the at least one timing signal.

17. The apparatus of claim 13, wherein the first descriptor timing information includes at least one of a timing pattern length, an address of a vector table corresponding to the timing pattern, an address of position table corresponding to the timing pattern, and timing pattern repeat information, and wherein the timing core is configured to generate a first timing pattern for a plurality of timing signals based on the first descriptor timing information.

18. The apparatus of claim 17, wherein the vector table lists at least one timing signal identifier, wherein the position table lists at least one toggle position of a timing pattern corresponding to the position table pointer, and wherein the timing core is configured to toggle the at least one timing signal based on the at least one toggle position.

19. The apparatus of claim 13, wherein the timing core further comprises a memory control unit, and wherein the memory control unit is configured to retrieve timing information from the timing generator memory and configured to stores the timing information in a timing core memory FIFO units based on at least one of the available space of the timing core memory, a status of a memory bus, and a status of the timing core control process.

20. The apparatus of claim 13, wherein the timing generator is configured to retrieve timing information from a system memory of an imaging device and configured to store the timing information to the timing generator memory upon system power-up.

21. The apparatus of claim 13, further comprising a plurality of timing signal communication units configured to transmit the timing signals over a plurality of communication channels.

22. The apparatus of claim 13, further comprising:
a timing generator memory coupled to a system memory, wherein the timing core is configured to load a portion of the timing information from a system memory to the timing generator memory based on an address provided in a descriptor register set,
wherein the processor core is configured to control a plurality of counters and information stored to the descriptor register set.

23. A timing generator for an imaging device comprising:
means for retrieving a first descriptor timing information from a first descriptor data structure of a plurality of descriptor data structures, the plurality of descriptor data structures arranged in a linked list;
means for retrieving first timing information from a memory based on the first descriptor timing information;
means for generating at least one timing signal based at least partly on the first timing information;
means for retrieving timing information from a timing generator memory; and
means for storing the timing information in a timing core memory based on at least one of the available space of the timing core memory, a status of a memory bus, and a status of the timing core control process.

24. A system to generate timing signals for an imaging device, the system comprising:
computer hardware including at least one computer processor; and
computer-readable storage comprising computer-readable instructions that, when executed by the computer processor, cause the computer hardware to perform operations defined by the computer-readable instructions, the computer-readable instructions configured to
retrieve a first descriptor timing information from a first descriptor data structure of a plurality of descriptor data structures, the plurality of descriptor data structures arranged in a linked list;
retrieve first timing information from a memory based on the first descriptor timing information;
retrieve a first descriptor pointer from the first descriptor data structure, the first descriptor pointer comprising an address of a second descriptor data structure in the linked list;
retrieve a second descriptor timing information from the second descriptor data structure of the plurality of descriptor data structures based on the first descriptor pointer;
retrieve second timing information from the memo based on the second descriptor timing information; and
generate at least one timing signal based at least partly on the first timing information and the second timing information.

* * * * *

UNITED STATES PATENT AND TRADEMARK OFFICE
CERTIFICATE OF CORRECTION

PATENT NO. : 8,648,952 B2  Page 1 of 1
APPLICATION NO. : 13/027111
DATED : February 11, 2014
INVENTOR(S) : Huo et al.

It is certified that error appears in the above-identified patent and that said Letters Patent is hereby corrected as shown below:

In the Specification:

In column 8 at line 39, Change "a an" to --an--.

In column 12 at line 16, Change "VBA." to --V8A.--.

In the Claims:

In column 22 at line 24 (approx.), In Claim 24, change "memo" to --memory--.

Signed and Sealed this
Twenty-ninth Day of July, 2014

Michelle K. Lee
*Deputy Director of the United States Patent and Trademark Office*